US009489721B2

(12) United States Patent
Sasaki et al.

(10) Patent No.: US 9,489,721 B2
(45) Date of Patent: Nov. 8, 2016

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventors: Takashi Sasaki, Tokyo (JP); Takayuki Hara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 12 days.

(21) Appl. No.: 14/600,898

(22) Filed: Jan. 20, 2015

(65) Prior Publication Data
US 2015/0206024 A1  Jul. 23, 2015

(30) Foreign Application Priority Data
Jan. 22, 2014  (JP) .................. 2014-009736

(51) Int. Cl.
*G06K 9/00* (2006.01)
*G06T 5/00* (2006.01)
(52) U.S. Cl.
CPC ..... *G06T 5/002* (2013.01); *G06T 2207/20012* (2013.01)
(58) Field of Classification Search
None
See application file for complete search history.

(56) References Cited

U.S. PATENT DOCUMENTS

| 7,327,877 | B2* | 2/2008 | Kita | H04N 1/62 |
| | | | | 382/167 |
| 7,834,917 | B2* | 11/2010 | Kinoshita | G06T 3/4023 |
| | | | | 348/241 |
| 8,385,677 | B2* | 2/2013 | Hu | H04N 1/409 |
| | | | | 382/261 |
| 8,693,801 | B2* | 4/2014 | Nakamura | H04N 1/4092 |
| | | | | 382/260 |
| 8,836,999 | B2* | 9/2014 | Higashi | H04N 1/409 |
| | | | | 358/1.9 |
| 2006/0285765 | A1* | 12/2006 | Chiu | G06T 5/20 |
| | | | | 382/261 |
| 2009/0016638 | A1* | 1/2009 | Nagatsuma | H04N 9/07 |
| | | | | 382/275 |
| 2012/0133804 | A1* | 5/2012 | Kim | H04N 5/3675 |
| | | | | 348/246 |

FOREIGN PATENT DOCUMENTS

| JP | 2000-69291 A | 3/2000 |
| JP | 2006-24149 A | 1/2006 |
| JP | 2009-258868 A | 11/2009 |
| JP | 2010-153969 A | 7/2010 |

\* cited by examiner

*Primary Examiner* — Daniel Mariam
(74) *Attorney, Agent, or Firm* — Canon USA, Inc. IP Division

(57) ABSTRACT

An image processing apparatus includes a selection unit, a pixel number setting unit, a determination unit, and a processing unit. The selection unit selects at least a pixel that is different from a pixel of interest in an image based on a similarity between a pixel value of the pixel different from the interest pixel and a pixel value of the interest pixel. The pixel number setting unit sets a number of pixels to be selected. The determination unit determines, from a pixel selected by the selection unit and based on whether a number of selected pixels has reached the set number of pixels, at least a pixel to be used in predetermined processing. The processing unit performs the predetermined processing on the interest pixel using a pixel value of the pixel determined by the determination unit.

19 Claims, 13 Drawing Sheets

IMAGE PROCESSING APPARATUS, IMAGE PROCESSING METHOD, AND STORAGE MEDIUM

BACKGROUND OF THE INVENTION

1. Field of the Invention

The present invention relates to an image processing apparatus, an image processing method, and a storage medium, and more particularly, is suitable for use to reduce noise contained in an image.

2. Description of the Related Art

In recent years, the pixel size of image sensors has been decreased. The decrease in pixel size tends to cause more noise in image signals obtained from the image sensors. One of the methods of reducing the noise by signal processing is a method in which smoothing processing is performed using a pixel of interest and adjacent pixels in the neighborhood of the pixel of interest.

Japanese Patent Application Laid-Open No. 2000-69291 discusses a technique of changing characteristics of a smoothing filter based on noise characteristics of an input image. More specifically, if the amount of noise in the input image is large, the mask size is increased to perform the smoothing processing on a larger area. On the other hand, if the amount of noise in the input image is small, the mask size is decreased to maintain a value of the pixel of interest at an original value (or a value close to the original value).

Further, Japanese Patent Application Laid-Open No. 2010-153969 discusses a technique of weighting adjacent pixels according to a similarity to a pixel of interest of an input image. More specifically, the direction of an edge (the direction in which pixels having substantially a same pixel value are aligned) in a search region of the input image around the pixel of interest is detected, and pixels located along the direction of the edge are selected as selected comparison pixels. For example, if a result of calculation by an edge detection filter along a downward oblique direction from an upper left corner toward a lower right corner of a 5×5 pixel region including a pixel of interest at its center is the smallest value, then the downward oblique direction is the direction of the edge of the pixel of interest. Next, the degree of similarity between the pixel of interest and each selected comparison pixel is calculated, and the weighting factor is calculated for each selected comparison pixel. Then, the smoothing processing is performed on the weighted selected comparison pixels to calculate the pixel value of the pixel of interest.

However, according to the technique discussed in Japanese Patent Application Laid-Open No. 2000-69291, the number of pixels to be used in the smoothing processing varies depending on the amount of noise. Thus, pixels with different noise reduction effects are dispersed in the image. This causes a problem that spots are clearly visible on an image having undergone the noise reduction processing.

Further, according to the technique discussed in Japanese Patent Application Laid-Open No. 2010-153969, the number of pixels to be used in smoothing processing also varies depending on whether a region includes an edge. Thus, in a region including an edge, the noise reduction effect is small. On the other hand, in an even region including no edge, the noise reduction effect is large. Thus, pixels with different noise reduction effects are dispersed in the image. This causes a problem that spots are clearly visible on an image having undergone the noise reduction processing.

SUMMARY OF THE INVENTION

The present invention is directed to a technique capable of preventing spots from being clearly visible on an image having undergone noise reduction processing.

According to an aspect of the present invention, an image processing apparatus includes a selection unit configured to select at least a pixel that is different from a pixel of interest in an image based on a similarity between a pixel value of the pixel different from the pixel of interest and a pixel value of the pixel of interest, a pixel number setting unit configured to set a number of pixels to be selected by the selection unit, a determination unit configured to determine, from a pixel selected by the selection unit and based on whether a number of pixels selected by the selection unit has reached the number of pixels set by the pixel number setting unit, at least a pixel to be used in predetermined processing, and a processing unit configured to perform the predetermined processing on the pixel of interest using at least a pixel value of a pixel different from the pixel of interest, wherein the processing unit performs the predetermined processing on the pixel of interest using a pixel value of the pixel determined by the determination unit.

There is provided an image processing apparatus capable of preventing a spot from being clearly visible on an image having been subjected to noise reduction processing. The image processing apparatus selects from a set reference region at least a pixel different from a pixel of interest in an image based on a similarity between a pixel value of the pixel and a pixel value of the pixel of interest and uses the selected pixels in predetermined processing. In a case where a number of pixels selected from the reference region does not reach the number determined in advance, the image processing apparatus expands the reference region. Further features of the present invention will become apparent from the following description of exemplary embodiments with reference to the attached drawings.

DESCRIPTION OF THE EMBODIMENTS

Exemplary embodiments of the present invention will be described with reference to the drawings.

First, a first exemplary embodiment will be described.

Figure 1:
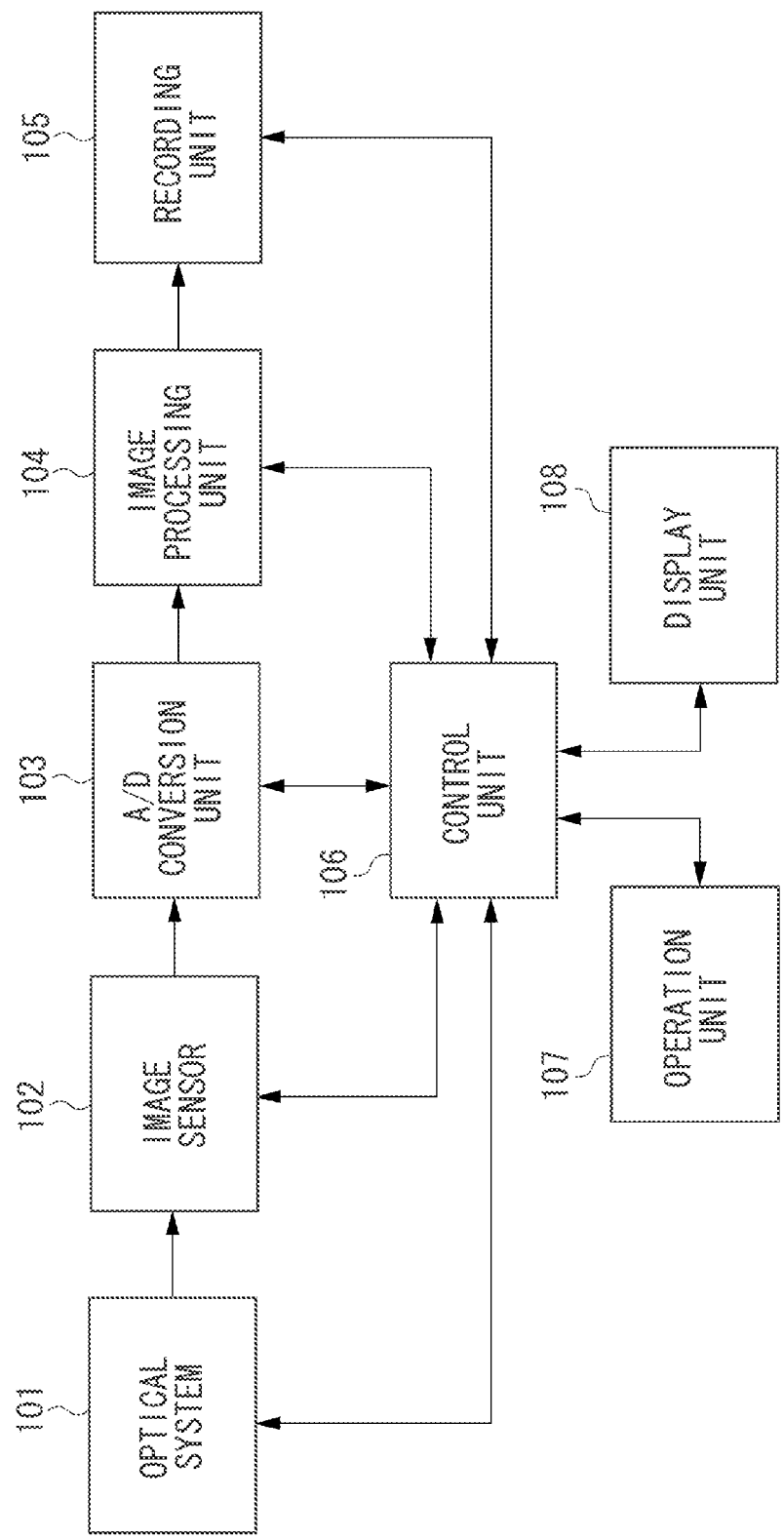
FIG. 1 is a block diagram illustrating a configuration of an image processing apparatus.

FIG. 1 is a block diagram illustrating an example of an imaging apparatus that is an application example of the configuration of an image processing apparatus. The image processing apparatus may also be any information processing apparatus (personal computer, etc.) other than an imaging apparatus.

The image processing apparatus includes an optical system 101, an image sensor 102, an analog/digital (A/D) conversion unit 103, an image processing unit 104, a recording unit 105, a control unit 106, an operation unit 107, and a display unit 108.

The optical system 101 includes a focusing lens, a diaphragm, and a shutter. In the optical system 101, the focusing lens is driven during imaging to focus on an object, and the diaphragm and the shutter are controlled to adjust an amount of exposure. The image sensor 102 is a photoelectric conversion element such as a charge-coupled device (CCD) sensor or a complementary metal oxide semiconductor (CMOS) sensor that performs photoelectric conversion to convert an amount of light of an object image formed by the optical system 101 into an electric signal. The A/D conversion unit 103 converts an electric signal input from the image sensor 102 into a digital signal. The image processing unit 104 performs processing such as noise reduction processing on a digital signal converted by the A/D conversion unit 103 to consequently convert the digital signal into image data in an image format such as the Joint Photographic Experts Group (JPEG) format and records the image data in the recording unit 105.

The control unit 106 controls operation of the entire image processing apparatus according to the present exemplary embodiment. The operation unit 107 is a unit that the user operates to give instructions to the image processing apparatus. The display unit 108 is, for example, a liquid crystal display or the like provided on a rear surface of the image processing apparatus (imaging apparatus). The display unit 108 displays images captured by the image sensor 102 and processed by the image processing unit 104, images stored in the recording unit 105, and the like.

Figure 2:
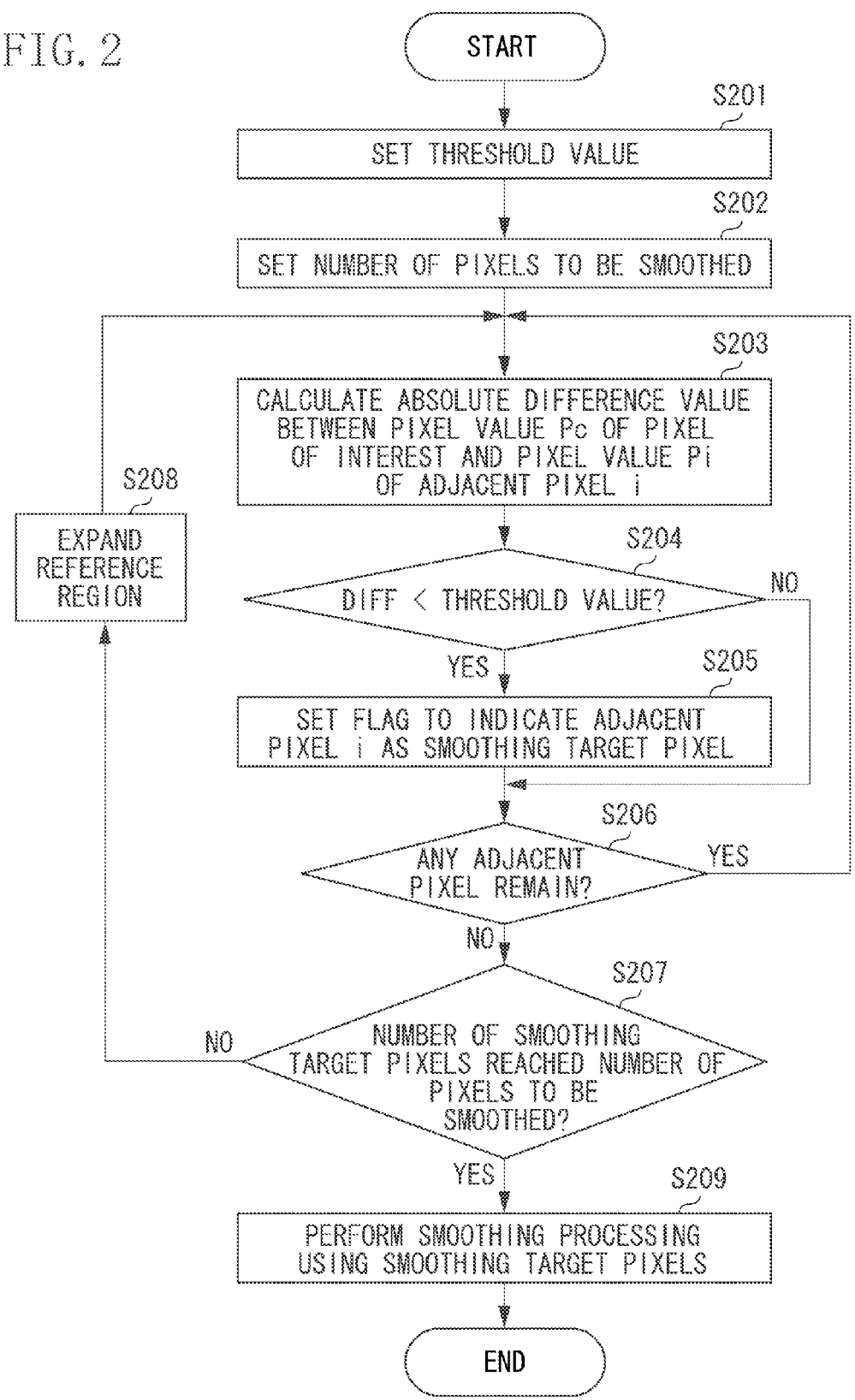
FIG. 2 is a flow chart illustrating an example of a process performed by an image processing apparatus according to a first exemplary embodiment.

FIG. 2 is a flow chart illustrating an example of a process performed by the image processing apparatus in the smoothing processing (noise reduction processing).

Figure 3:
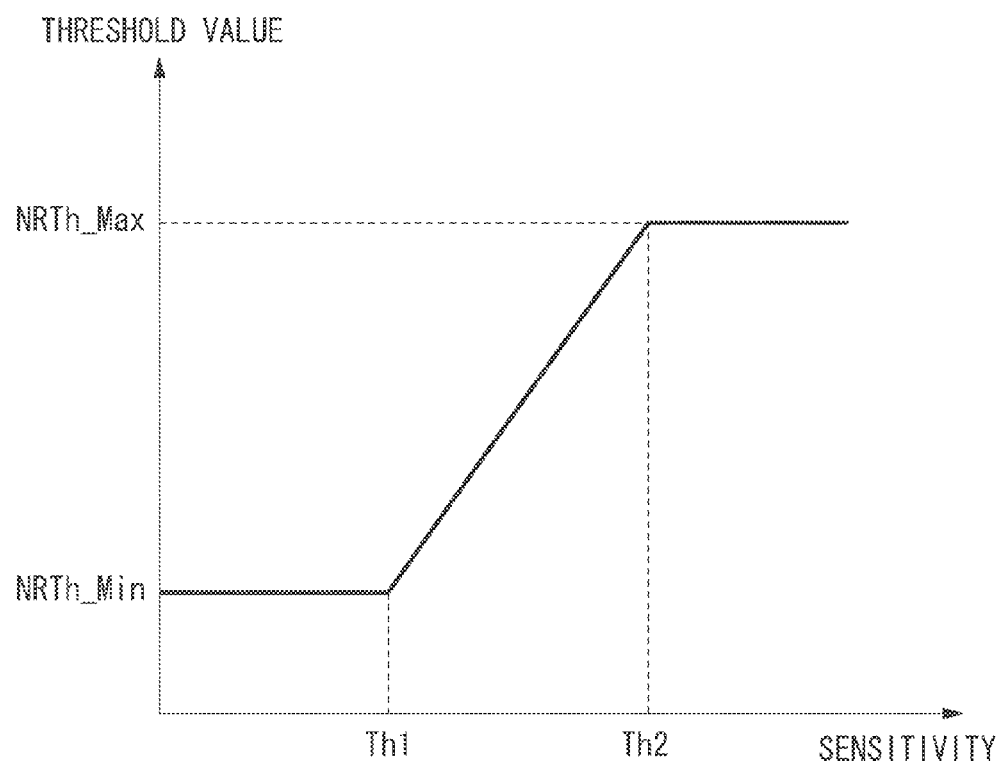
FIG. 3 is a graph illustrating threshold values.

First, in step S201, the image processing unit 104 sets a threshold value that is to be used in step S204. FIG. 3 illustrates an example of the threshold value set in step S201. In FIG. 3, the horizontal axis shows the sensitivity (International Organization for Standardization (ISO) sensitivity) at the time of capturing an input image, and the vertical axis shows the threshold value to be used in the processing executed in step S204. In the example illustrated in FIG. 3, in a case where the sensitivity is equal to or lower than Th1, the threshold value is NRTh_Min. In the example illustrated in FIG. 3, in a case where the sensitivity is equal to or higher than Th2, the threshold value is NRTh_Max. In the example illustrated in FIG. 3, in a case where the sensitivity is higher than Th1 and lower than Th2, the threshold value is a value on a straight line connecting two coordinates (Th1, NRTh_Min) and (Th2, NRTh_Max).

The threshold value may be changed according to at least one of the brightness of an input image and the temperature of the image sensor 102, in addition to or in place of the sensitivity. The brightness of an input image can be obtained from, for example, a pixel value (luminance value) of each pixel of the input image. Further, the temperature of the image sensor 102 can be obtained from, for example, a value measured by a temperature sensor that measures the temperature of the image sensor 102.

Referring back to FIG. 2, in step S202, the image processing unit 104 sets the number of pixels to be used in step S209.

Desirably, the number of pixels that is set in step S202 is changed for each image. For example, desirably, the number of pixels that is set in step S202 is changed according to at least one of the sensitivity at the time of capturing the input image, the brightness of the input image, and the temperature of the image sensor 102. In this case, the number of pixels that is set in step S202 is desirably large, because noise tends to increase at higher sensitivities at the time of capturing the input image, higher brightnesses of the input image, and higher temperatures of the image sensor 102. In the following description, the number of pixels that is set in step S202 is "8". Hereinafter, the number of pixels that is set in step S202 is sometimes referred to as "the number of pixels to be smoothed" when necessary.

Figure 4:
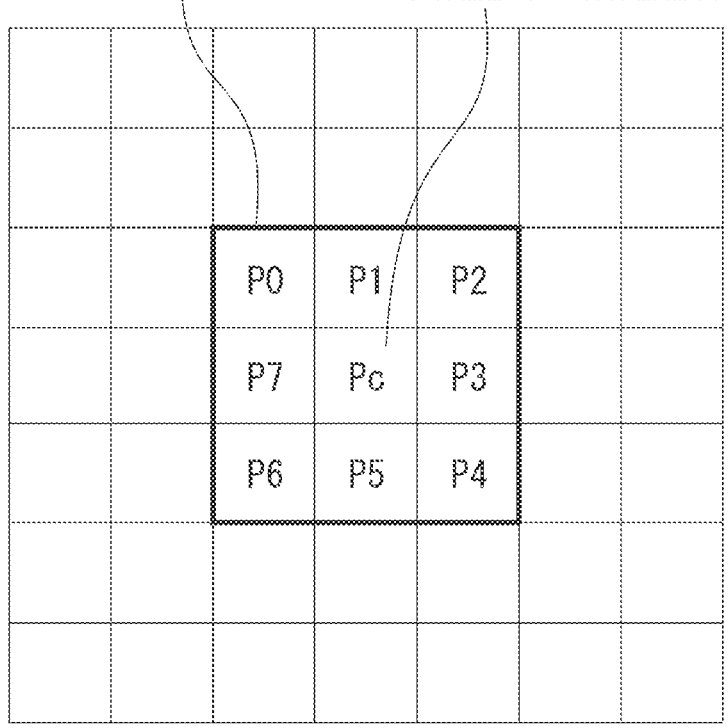
FIG. 4 illustrates a pixel of interest and adjacent pixels.

FIG. 4 illustrates an example of a pixel-of-interest 401 and adjacent pixels included in a reference region 402 including the pixel-of-interest 401 at its center. FIG. 4 illustrates as an example a case where eight pixels that are included in the reference region 402 of 3×3 pixels and are at a distance Z of 1 from the pixel-of-interest 401 are set as adjacent pixels.

Referring back to FIG. 2, in step S203, the image processing unit 104 calculates for each adjacent pixel i an absolute difference value DIFF (=|Pc−Pi|) between a pixel value Pc of the pixel-of-interest 401 and a pixel value Pi (i=0 to 7) of an adjacent pixel i. The distance Z is represented by the following formula (1):

$$Z=\sqrt{(Xc-Xi)^2+(Yc-Yi)^2} \quad (1)$$

where (Xc, Yc) is the position (coordinates) of the pixel-of-interest 401, and (Xi, Yi) is the position (coordinates) of the adjacent pixel i. In the present exemplary embodiment, the absolute difference value DIFF represents the degree of similarity between the pixel value Pc of the pixel-of-interest 401 and the pixel value Pi (i=0 to 7) of the adjacent pixel i. The degree of similarity, however, is not limited to the absolute difference value.

Next, in step S204, the image processing unit 104 determines whether the absolute difference value DIFF is smaller than the threshold value set in step S201. As a result of the determination, if the absolute difference value DIFF is smaller than the threshold value (YES in step S204), the processing proceeds to step S205. In step S205, the image processing unit 104 sets a flag to the adjacent pixel i to indicate that the adjacent pixel i is a pixel on which the smoothing processing is to be performed. Then, the processing proceeds to step S206. In the following description, the adjacent pixel i to which the flag is set is sometimes referred to as "smoothing target pixel" when necessary.

On the other hand, in step S204, if the image processing unit 104 determines that the absolute difference value DIFF is equal to or larger than the threshold value set in step S201 (NO in step S204), the processing skips step S205 and proceeds to step S206.

In step S206, the image processing unit 104 determines whether any adjacent pixel i for which the calculation is to be performed remains. As a result of the determination, if an adjacent pixel i for which the calculation is to be performed remains (YES in step S206), the processing returns to step S203, and the image processing unit 104 selects an unselected adjacent pixel i and repeats steps S203 to S206. On the other hand, if no adjacent pixel i for which the calculation is to be performed remains (NO in step S206), the processing proceeds to step S207.

In step S207, the image processing unit 104 determines whether the total number of smoothing target pixels has reached the number of pixels to be smoothed that is set in step S202. As used herein, the total number of smoothing target pixels refers to the sum of the number of pixels-of-interest 401 (=1) and the number of adjacent pixels i to which the flag is set in step S205. As a result of the determination, if the number of smoothing target pixels has reached the number of pixels to be smoothed that is set in step S202 (YES in step S207), the processing proceeds to step S209. In step S209, the image processing unit 104 performs smoothing processing on the pixel-of-interest 401 using the pixel value of the pixel-of-interest 401 and the pixel values of the smoothing target pixels to each of which the flag is set in step S205.

For example, in FIG. 4, in a case where the adjacent pixels i with the pixel values of P0, P1, P2, P3, P4, P5, and P6 are set as smoothing target pixels, the total number of smoothing target pixels including the pixel of interest Pc is 8. In the present exemplary embodiment, as described above, the number of pixels to be smoothed that is set in step S202 is "8". Accordingly, the number of smoothing target pixels to each of which the flag is set in step S205 has reached the number of pixels to be smoothed that is set in step S202. Then, the image processing unit 104 calculates a pixel value P_OUT of the pixel-of-interest 401 having undergone the smoothing processing using the following formula (2):

$$P\_OUT=(Pc+P0+P1+P2+P3+P4+P5+P6)/8 \quad (2).$$

As described above, in the present exemplary embodiment, the pixel value of the pixel of interest having undergone the smoothing processing is represented by an average value (arithmetic mean value) of the pixel value of the pixel of interest and the pixel values of the smoothing target pixels.

In a case where all adjacent pixels i with the pixel values of P0 to P7 are set as smoothing target pixels, the number of smoothing target pixels including the pixel-of-interest 401 is 9, which is larger than the number of pixels to be smoothed that is set in step S202. In this case, the image processing unit 104 selects seven adjacent pixels i in increasing order of the absolute difference value DIFF, and performs the smoothing processing using the pixel values of the selected adjacent pixels i and the pixel-of-interest 401.

On the other hand, as a result of the determination in step S207, if the number of smoothing target pixels has not reached the number of pixels to be smoothed that is set in step S202 (NO in step S207), the processing proceeds to step S208.

Figure 5:
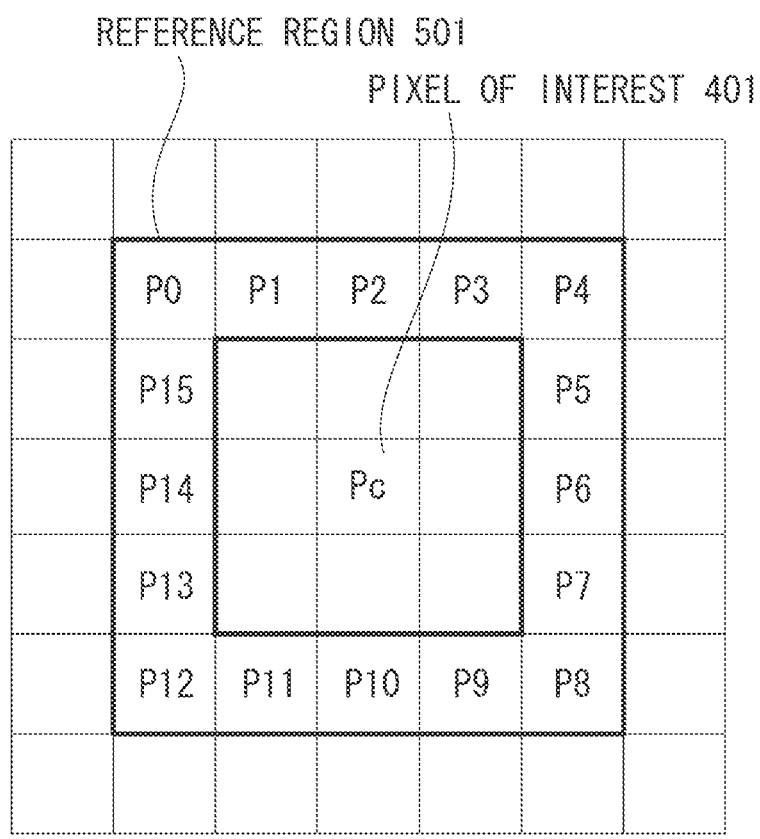
FIG. 5 illustrates an expanded reference region.

In step S208, the image processing unit 104 expands the reference region. FIG. 5 illustrates an example of an expanded reference region 501. As illustrated in FIG. 5, the distance Z is increased by 1 from the current distance Z, and an area with the distance Z of 2 from the pixel-of-interest 401 is set as the new reference region 501. Adjacent pixels i included in the reference region 501 are 16 pixels in total with the pixel values of P0 to P15.

Then, the processing returns to step S203, and the image processing unit 104 repeats steps S203 to S208 while expanding the reference region, until the image processing unit 104 determines in step S207 that the number of smoothing target pixels has reached the number of pixels to be smoothed that is set in step S202.

As a result of the expansion of the reference region, if the number of smoothing target pixels becomes larger than the number of pixels to be smoothed that is set in step S202, the following processing is performed. Specifically, adjacent pixels i are selected in increasing order of the distance Z and the absolute difference value DIFF. The number of adjacent pixels i to be selected by the image processing unit 104 is smaller by 1 than the number of pixels to be smoothed that is set in step S202. Then, the image processing unit 104 performs the smoothing processing using the pixel values of the selected adjacent pixels i and the pixel-of-interest 401. At this time, the image processing unit 104 may select the adjacent pixels i with priority given to the distance Z over the absolute difference value DIFF. Thus, adjacent pixels i with a smaller absolute difference value DIFF than the threshold value may be selected in increasing order of the distance Z. In this case, the adjacent pixels i with the same distance Z may be selected in increasing order of the absolute difference value DIFF.

Figure 6:
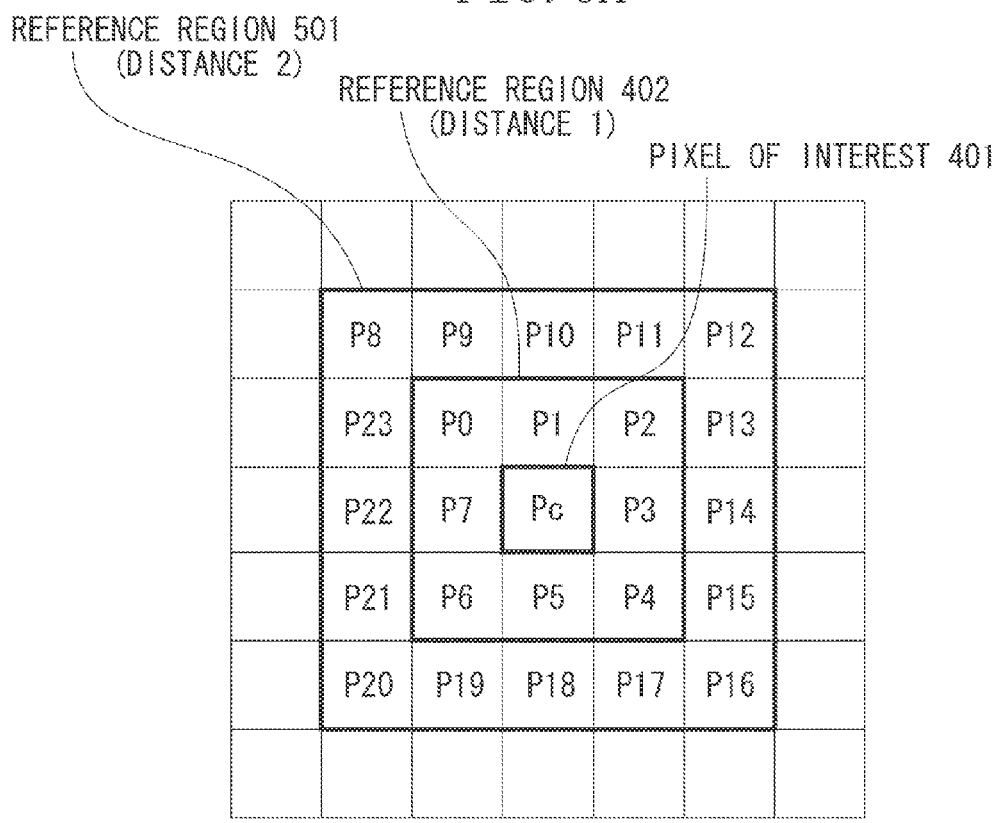
FIGS. 6A and 6B illustrate absolute difference values between a pixel of interest and adjacent pixels.

FIG. 6A illustrates an example of the pixel of interest and the adjacent pixels, and FIG. 6B illustrates an example of the absolute difference values DIFF of the pixel of interest and the adjacent pixels.

In the example illustrated in FIG. 6A, the adjacent pixels i with a distance Z of 1 from the pixel-of-interest 401 having a pixel value of Pc are pixels having pixel values of P0, P1, P2, P3, P4, P5, P6, and P7. The adjacent pixels i with a distance Z of 2 from the pixel-of-interest 401 having a pixel value of Pc are pixels having pixel values of P8, P9, P10, P11, P12, P13, P14, P15, P16, P17, P18, P19, P20, P21, P22, and P23. Further, the absolute difference values DIFF between the pixel values of the adjacent pixels i and the pixel value of the pixel-of-interest 401 are as illustrated in FIG. 6B. Further, the threshold value set in step S201 is 50.

Then, in the example illustrated in FIG. 6B, the adjacent pixels i with the pixel values of P3, P4, P5, P6, P15, P16, and P17 are selected as smoothing target pixels. A pixel value P_OUT of the pixel of interest having undergone the smoothing processing is represented by the following formula (3):

$$P\_OUT=(Pc+P3+P4+P5+P6+P15+P16+P17)/8 \quad (3).$$

The result is 26.

In a case where the reference region is expanded to the entire image but the number of smoothing target pixels does not reach the number of pixels to be smoothed that is set in step S202, the image processing unit 104 performs the smoothing processing using only the already detected smoothing target pixels and the pixel of interest.

The foregoing processing is performed on each pixel of the input image so that noise is reduced from the entire input image to obtain a noise-reduced output image.

As described above, in the present exemplary embodiment, the reference region is expanded until the number of selected adjacent pixels i reaches a predetermined number (the number of pixels to be smoothed) of adjacent pixels i with a smaller absolute difference value DIFF from the pixel value of the pixel-of-interest 401 than the threshold value, and the smoothing processing is performed using the pixel values of the predetermined number of adjacent pixels i and the pixel value of the pixel-of-interest 401. Thus, the number of adjacent pixels i to be used in the smoothing processing can be made uniform throughout the image. This can prevent dispersion of pixels with different noise reduction effects in the image. Accordingly, an image processing apparatus can be provided that can generate an image without clearly visible spots after noise reduction processing.

Desirably, the number of pixels to be used in the smoothing processing is set equal to the number of pixels to be smoothed as in the present exemplary embodiment. In this way, the number of adjacent pixels i to be used in the smoothing processing can be made uniform throughout the image. However, it is not limited thereto. For example, even in the case where the number of smoothing target pixels exceeds the number of pixels to be smoothed as a result of the expansion of the reference region, if the difference is within a predetermined range (e.g., 1), all of the smoothing target pixels may be used as pixels to be used in the smoothing processing.

A second exemplary embodiment will be described. In the first exemplary embodiment, the case where a reference region is expanded to an entire region of an input image is described as an example. In the present exemplary embodiment, an upper limit value is set to a reference region to be expanded to reduce calculation loads. A main difference between the present exemplary embodiment and the first exemplary embodiment is the processing to set the upper limit value to the size of the reference region. Accordingly, in the following description of the present exemplary embodiment, components that are similar to those in the first exemplary embodiment are given the same reference numerals as those specified in FIGS. 1 to 6, and detailed description thereof is omitted.

Figure 7:
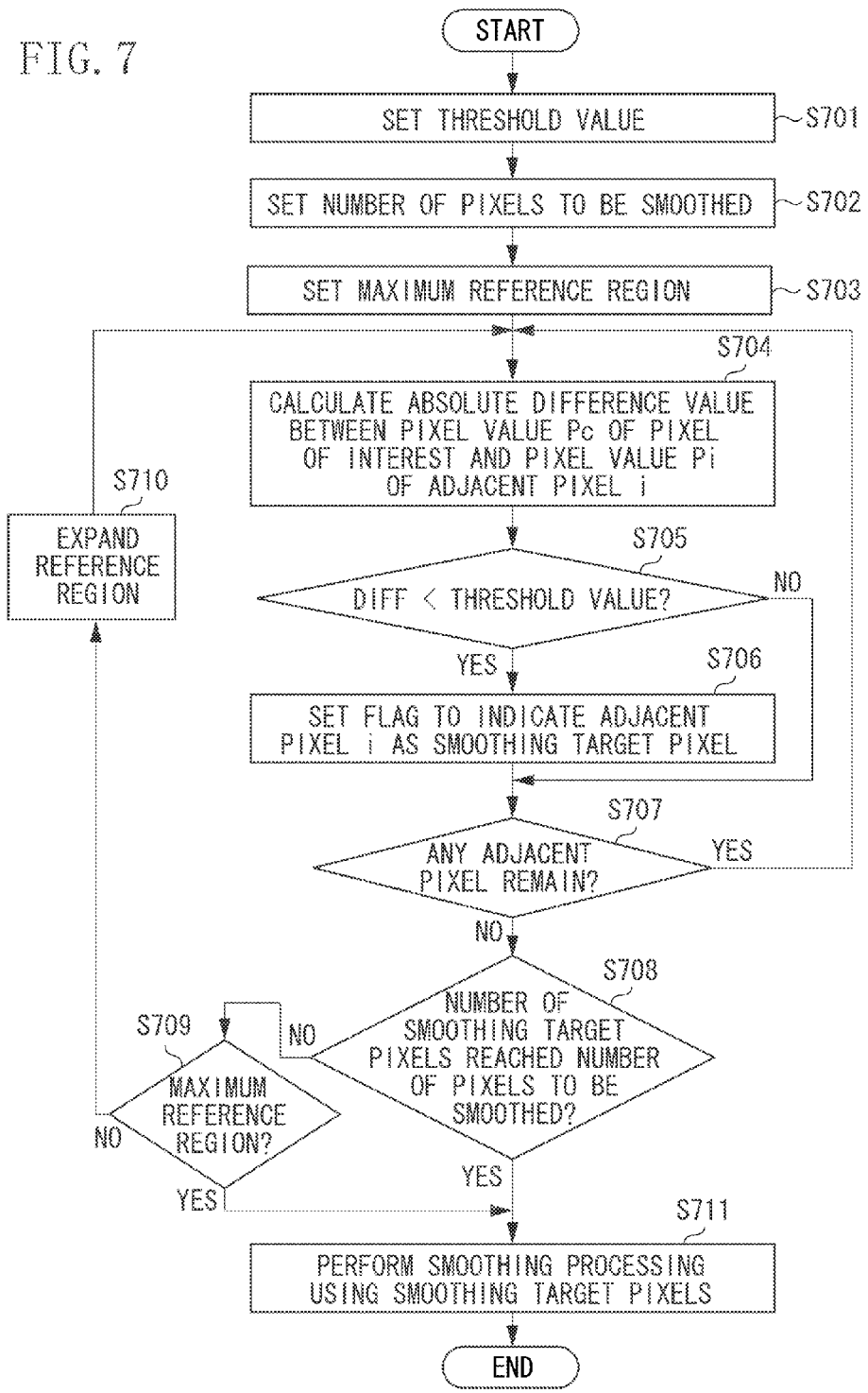
FIG. 7 is a flow chart illustrating an example of a process performed by an image processing apparatus according to a second exemplary embodiment.

FIG. 7 is a flow chart illustrating an example of a process performed by the image processing apparatus in the smoothing processing (noise reduction processing).

Steps S701 and S702 are respectively similar to steps S201 and S202 in FIG. 2 described in the first exemplary embodiment.

In step S703, the image processing unit 104 sets a maximum reference region that is a maximum value of the size of the reference region. An example of a method of setting the maximum reference region will be described.

In a case where the reference region becomes the maximum, i.e., a case where it is necessary to refer to a pixel at the greatest distance Z from the pixel-of-interest 401, it is considered that the pixel-of-interest 401 is probably of a type that exists in a small number in the screen. Thus, for the pixels that exist in a small number in the screen, the size of the reference region that is necessary to reach the number of pixels to be smoothed that is set in step S702 is calculated in advance and set as the maximum reference region. A specific example of a method of setting the maximum reference region will be described.

Figure 8:
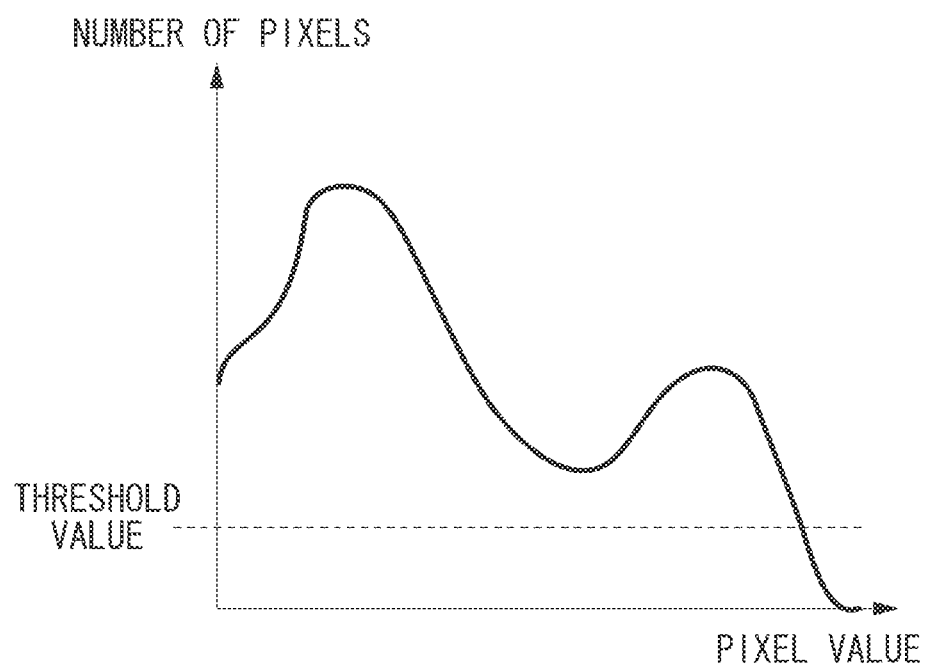
FIG. 8 is a histogram of pixel values.

FIG. 8 illustrates an example of a relationship between a pixel value of an input image and the number of pixels (histogram of pixel values).

As illustrated in FIG. 8, the image processing unit 104 derives (calculates) a histogram of pixel values with respect to an entire image. Then, the image processing unit 104 selects as a pixel of interest a pixel that exists in a smaller number than the preset threshold value.

Next, the image processing unit 104 performs steps S203 to S208 in FIG. 2 described in the first exemplary embodiment on every one of the selected pixels of interest.

Lastly, the image processing unit 104 sets the largest reference region as the maximum reference region among all the selected pixels of interest.

A method of setting the maximum reference region is not limited thereto, and any method can be used by which a size that is smaller than the size of an input image can be set as the upper limit value of the expansion range of the reference region.

Referring back to FIG. 7, steps S704 to S707 are respectively similar to steps S203 to S206 in FIG. 2 described in the first exemplary embodiment.

In step S708, as in step S207 in FIG. 2, the image processing unit 104 determines whether the total number of smoothing target pixels has reached the number of pixels to be smoothed that is set in step S702. As a result of the determination, if the number of smoothing target pixels has reached the number of pixels to be smoothed that is set in step S702 (YES in step S708), the processing proceeds to step S711. Then, in step S711, as in step S209 in FIG. 2, the image processing unit 104 performs smoothing processing on the pixel-of-interest 401 using the smoothing target pixels to each of which the flag is set in step S706.

On the other hand, as a result of the determination in step S708, the number of smoothing target pixels has not reached the number of pixels to be smoothed that is set in step S702 (NO in step S708), the processing proceeds to step S709.

In step S709, the image processing unit 104 determines whether the size of the current reference region is the maximum reference region set in step S703. As a result of the determination, if the size of the current reference region is the maximum reference region set in step S703 (YES in step S709), the processing proceeds to step S711 described above, and the image processing unit 104 performs smoothing processing. In this case, even if the total number of smoothing target pixels (the sum of the number of adjacent pixels i to each of which the flag is set in step S706 and the number of pixels-of-interest 401 (=1)) has not reached the number of pixels to be smoothed that is set in step S702, the image processing unit 104 performs smoothing processing using the detected smoothing target pixels.

On the other hand, as a result of the determination in step S709, if the size of the current reference region is not the maximum reference region set in step S703 (NO in step S709), the processing proceeds to step S710. In step S710, as in step S208 in FIG. 2, the image processing unit 104 expands the reference region, and the processing returns to step S704. Then, the image processing unit 104 repeats steps S704 to S710 either until the image processing unit 104 determines in step S708 that the number of smoothing target pixels has reached the number of pixels to be smoothed or until the image processing unit 104 determines in step S709 that the size of the current reference region is the maximum reference region.

The processing described above is performed on each pixel of the input image so that noise is reduced from the entire input image to obtain a noise-reduced output image.

As described above, in the present exemplary embodiment, the upper limit value of the size of the reference region to be expanded is set. This produces an advantage that calculation loads can be reduced, in addition to the advantage described in the first exemplary embodiment.

A third exemplary embodiment will be described. In the first and second exemplary embodiments, the case where the reference region is expanded is described as an example. In the present exemplary embodiment, a case where a large reference region is set in advance and the size of the reference region is not changed will be described. This implementation is suitable especially for a case where the processing to perform image processing on an image signal is realized by an electronic circuit provided in a digital camera. A main difference between the present exemplary embodiment and the first and second exemplary embodiments is a method of setting the reference region. Accordingly, in the following description of the present exemplary embodiment, components that are similar to those in the first or second exemplary embodiment are given the same reference numerals specified in FIGS. 1 to 8, and detailed description thereof is omitted.

Figure 9:
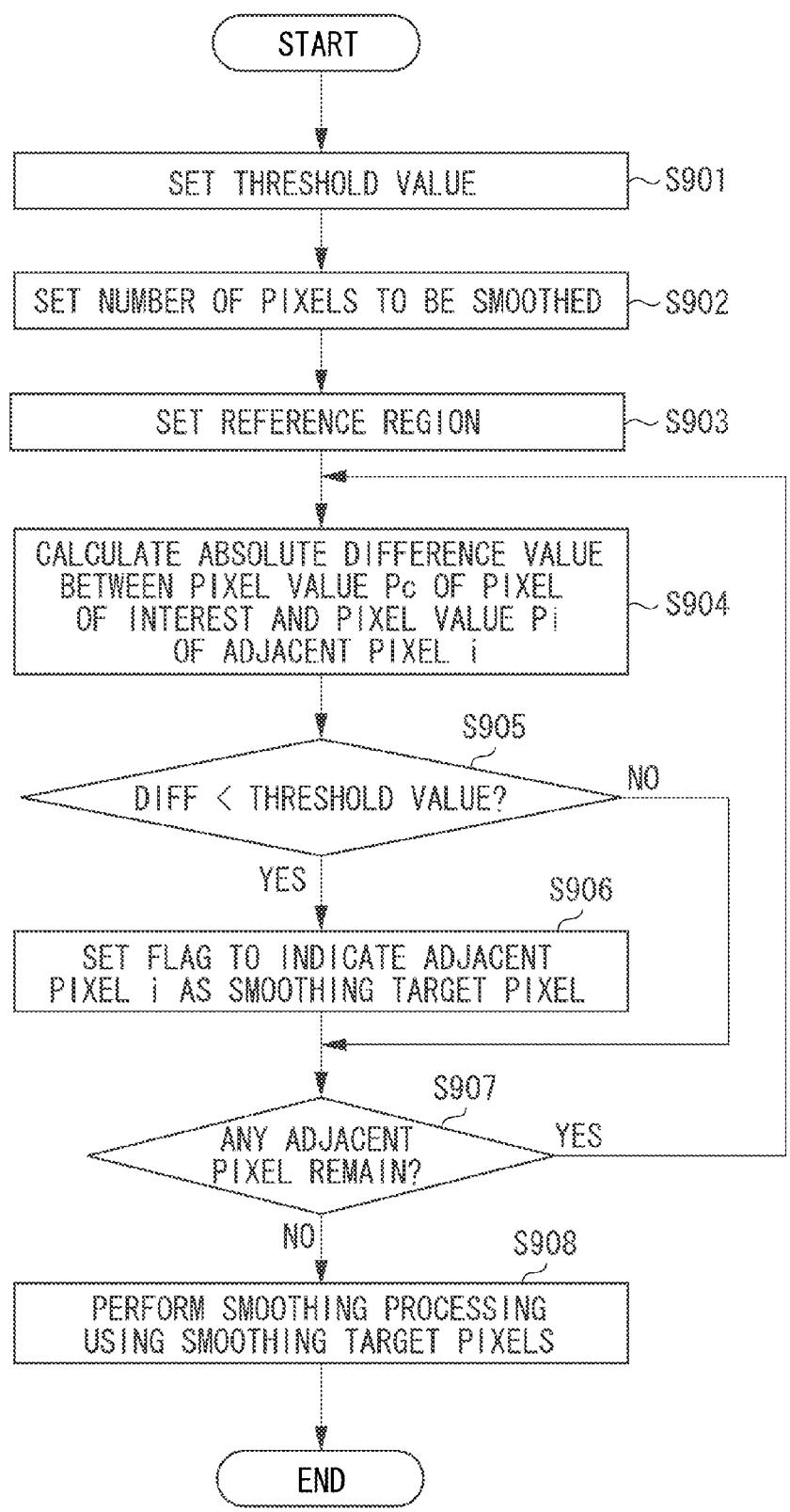
FIG. 9 is a flow chart illustrating an example of a process performed by an image processing apparatus according to a third exemplary embodiment.

FIG. 9 is a flow chart illustrating an example of a process performed by the image processing apparatus in the smoothing processing (noise reduction processing).

Steps S901 and S902 are respectively similar to steps S201 and S202 in FIG. 2 described in the first exemplary embodiment.

In step S903, the image processing unit 104 sets a reference region. The reference region set in step S903 is set to include a large region of, for example, about 100×100 pixels.

Remaining steps S904 to S907 are respectively similar to steps S203 to S206 in FIG. 2. Further, step S908 is similar to step S209 in FIG. 2.

The adjacent pixels i in step S904 refer to pixels included in the large reference region set in step S903, e.g., a region of 100×100 pixels including the pixel-of-interest 401 at its center.

Further, in step S908, the image processing unit 104 selects from the smoothing target pixels the adjacent pixels i in increasing order of the distance Z from the pixel-of-interest 401 and the absolute difference value DIFF until the number of selected adjacent pixels i becomes equal to the number of pixels to be smoothed that is set in step S902. Then, the image processing unit 104 performs smoothing processing using the selected adjacent pixels i and the pixel of interest. At this time, as described in the first exemplary embodiment, the adjacent pixels i with a smaller absolute difference value DIFF than the threshold value may be selected in increasing order of the distance Z.

In step S907, if the number of smoothing target pixels has not reached the number of pixels to be smoothed that is set in step S902 at the time of completion of the calculation for every adjacent pixel i in the reference region, the image processing unit 104 performs smoothing processing using only the already detected smoothing target pixels and the pixel of interest.

The above-described processing is performed on each pixel of the input image so that noise is reduced from the entire input image to obtain a noise-reduced output image.

As described above, in the present exemplary embodiment, a large reference region is set in advance. This produces an advantage that smoothing processing can be provided that is suitable especially for a case where the processing to perform image processing on an image signal is realized by an electronic circuit provided in a digital camera, in addition to the advantage described in the first exemplary embodiment.

A fourth exemplary embodiment will be described. In the first exemplary embodiment, the case where a reference region is set with respect to an input pixel is described as an example. In the present exemplary embodiment, images captured at different times are further included in a reference region to detect smoothing target pixels from a wider range of pixels. A main difference between the present exemplary embodiment and the first to third exemplary embodiments is a method of setting a reference region. Thus, in the following description of the present exemplary embodiment, components that are similar to those in the first to third exemplary embodiments are given the same reference numerals as those specified in FIGS. 1 to 9, and detailed description thereof is omitted.

Figure 10:
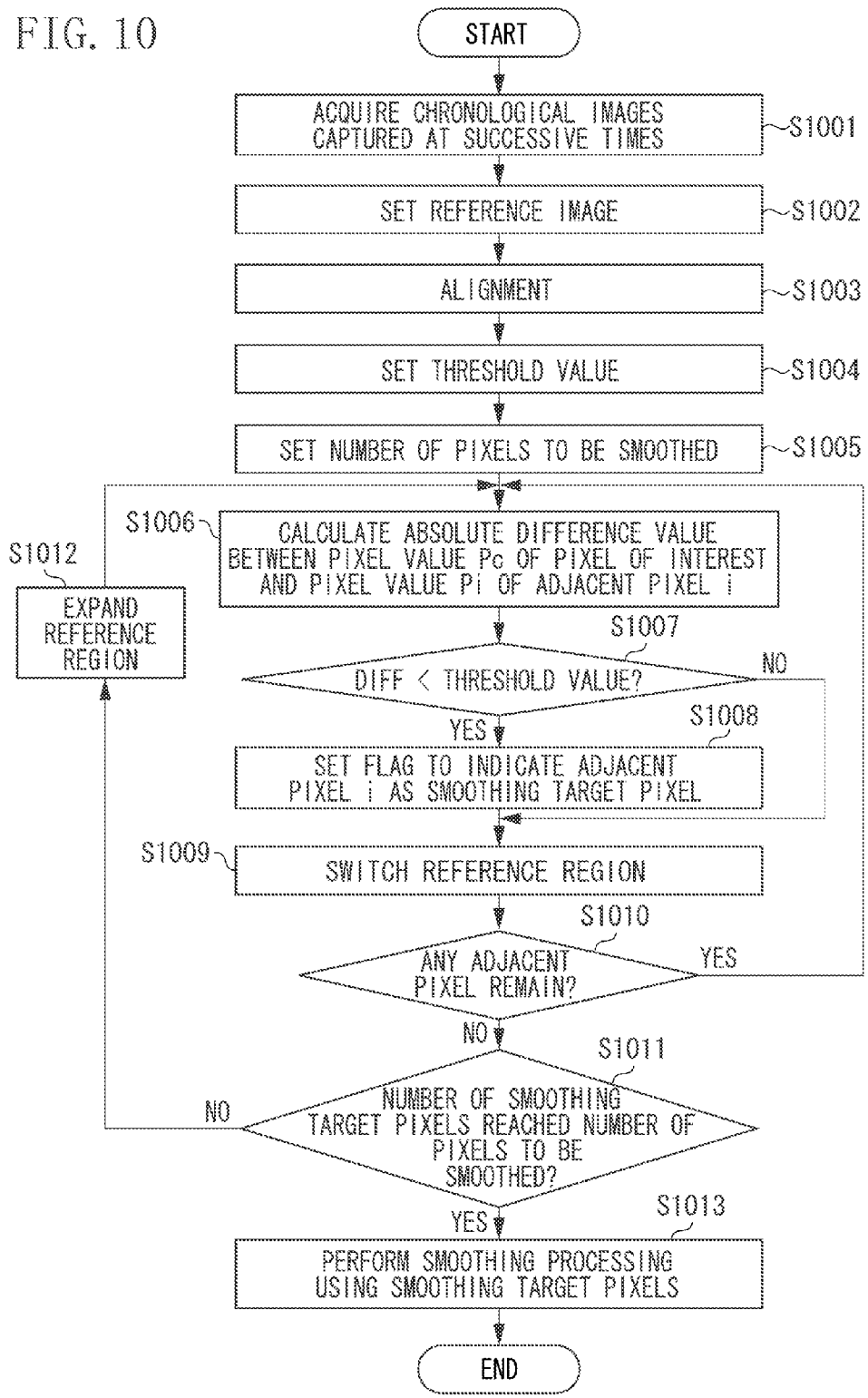
FIG. 10 is a flow chart illustrating an example of a process performed by an image processing apparatus according to a fourth exemplary embodiment.

FIG. 10 is a flow chart illustrating an example of a process performed by the image processing apparatus in the smoothing processing (noise reduction processing).

In step S1001, the image processing unit 104 captures multiple chronological images captured at successive times by the image sensor 102. In the present exemplary embodiment, since the image processing apparatus is the imaging apparatus, the case of acquiring multiple chronological images captured at successive times by the image sensor 102 will be described as an example. In a case where the image processing apparatus is an information processing apparatus other than an imaging apparatus, multiple chronological images captured at successive times are acquired from a personal computer (not illustrated) or the like.

Next, in step S1002, the image processing unit 104 sets as a reference image an image to be used as a reference, among the multiple images acquired in step S1001.

Figure 11:
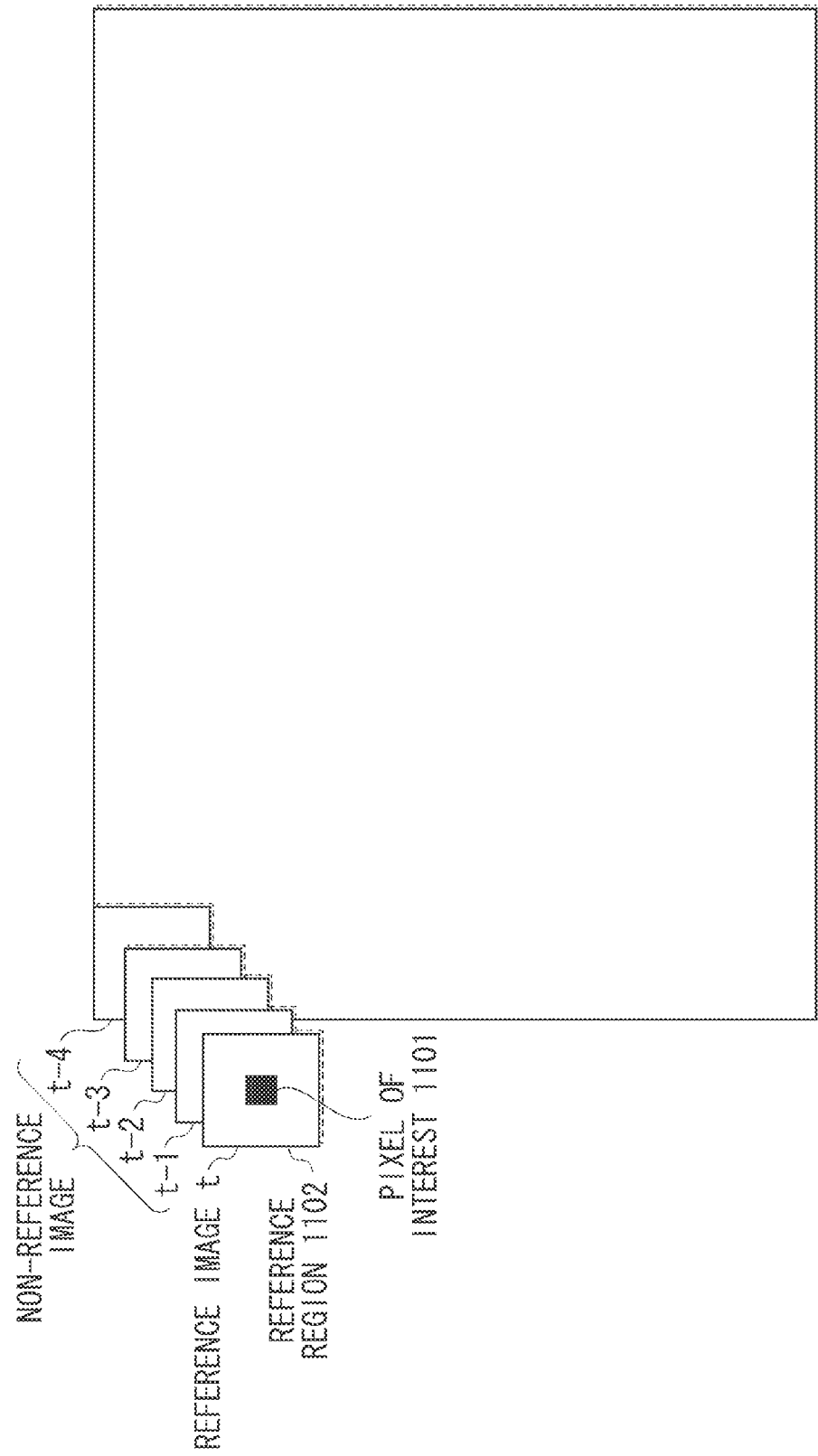
FIG. 11 illustrates a reference image and non-reference images.

FIG. 11 illustrates an example of a reference image and non-reference images.

In the example illustrated in FIG. 11, an image captured at a time t is set as a reference image, and images captured at times t-1 to t-4 prior to the time t are set as non-reference images.

A method of selecting a reference image and non-reference images is not limited to the above-described method. For example, among the multiple chronological images captured at successive times, an image captured at the time t-2, which is the intermediate time, may be selected as a reference image.

Next, in step S1003, the image processing unit 104 aligns the reference image with the non-reference images. A method of detecting a positional deviation between images to align the images can be realized by a publicly-known method such as the block matching discussed in Japanese Patent Application Laid-Open No. 2009-258868. Thus, detailed description of the alignment of the reference image with the non-reference images is omitted. Then, the image processing unit 104 moves the coordinates of the non-reference images by the detected positional deviation to align the relative positions of the reference image and the non-reference images.

The image processing unit 104 performs the above-described alignment processing to align the reference image with each of the non-reference images separately. As a result of the above-described alignment processing, the relative positions of the pixel of interest and the reference region in the reference image and the pixel of interest and the reference region in each of the non-reference images match.

Subsequent steps S1004 to S1008 are respectively similar to steps step S201 to S205 in FIG. 2.

Figure 12:
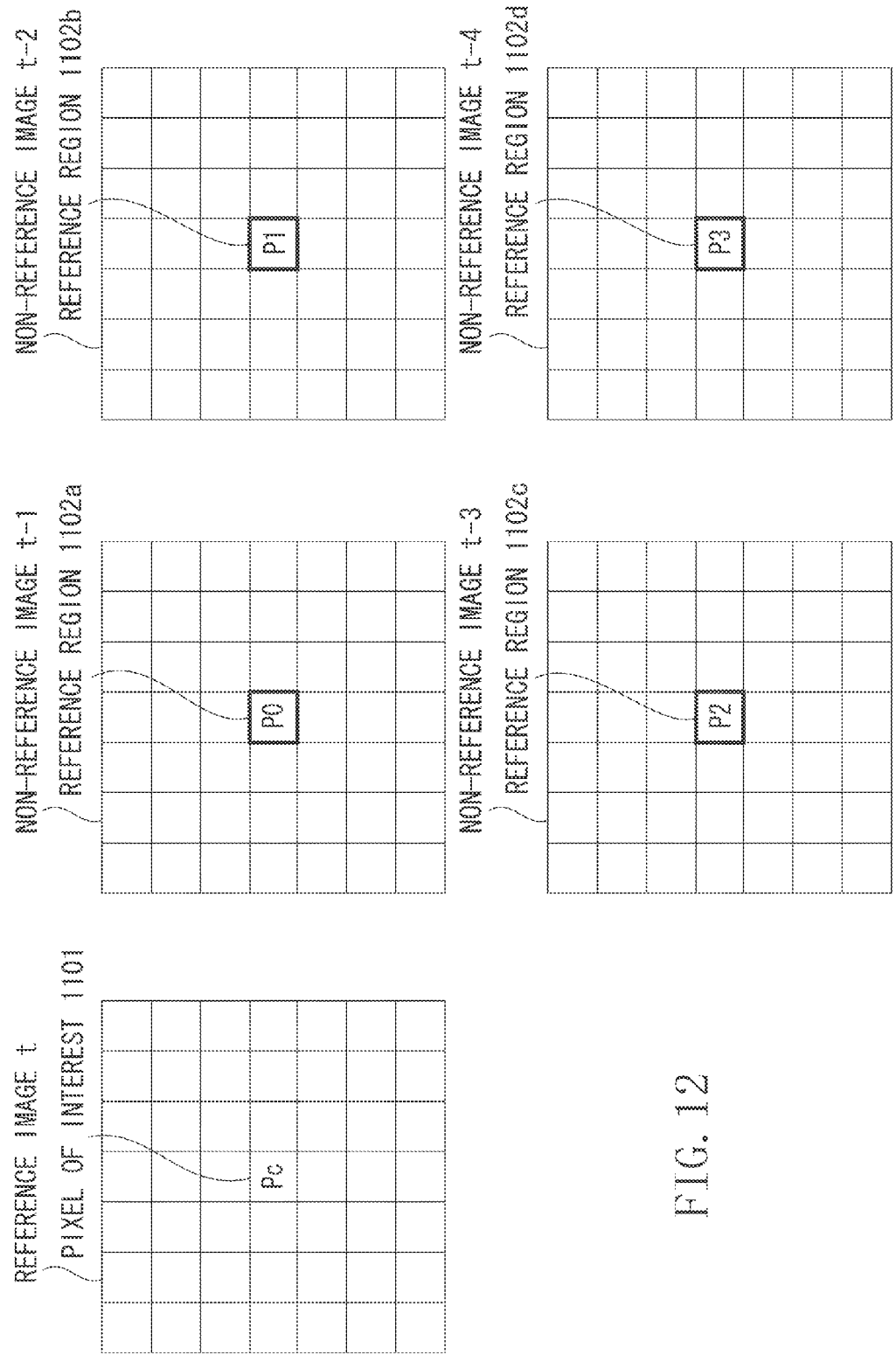
FIG. 12 illustrates reference regions in first processing on a pixel of interest.

FIG. 12 illustrates an example of reference regions 1102a to 1102d in the first processing on a pixel-of-interest 1101. In the example illustrated in FIG. 12, in the first processing, the calculation is performed using as the adjacent pixels i pixels (pixel value P0, P1, P2, P3) in the non-reference images that are at corresponding relative positions with respect to the pixel-of-interest 1101 (pixel value Pc) in the reference image. In the case where the reference region 1102 is expanded in the temporal direction as described above, pixels in the non-reference images that are at the corresponding relative positions with respect to the pixel-of-interest 1101 in the reference image are preferentially used as the adjacent pixels i in the calculation.

Further, in step S1003, in a case where a moving object in a non-reference image is detected and a reference region in the non-reference image corresponds to the moving object, the pixels in the reference region (or pixels constituting the moving object in the reference region) may be excluded from the smoothing target pixels. In the case where the reference region corresponds to the moving object, it is highly likely that the pixel-of-interest 1101 in the reference image and the reference region in the non-reference image are of different objects. Accordingly, the pixel value of the reference region may be close to the pixel value of the pixel-of-interest 1101, but this is probably due to influences of noise components, lights, etc. Thus, in many cases, deterioration in image quality can be prevented if use of such adjacent pixels i in the smoothing processing is avoided. A method of detecting a moving object can be realized by a publicly-known technique such as a technique discussed in Japanese Patent Application Laid-Open No. 2006-24149, so that detailed description thereof is omitted in the present specification.

Referring back to FIG. 10, in step S1009, the image processing unit 104 switches the reference regions in the chronological images (the reference image and the non-reference images). For example, the image processing unit 104 can switch the reference regions in the chronological images in the following order: the reference image and then the non-reference images captured at the times t-1, t-2, t-3, and t-4 in increasing order of time from the reference image.

Next, in step S1010, as in step S206 in FIG. 2, the image processing unit 104 determines whether any adjacent pixel i for which the calculation is to be performed remains. As a result of the determination, if an adjacent pixel i for which the calculation is to be performed remains (YES in step S1010), the processing returns to step S1006, and the image processing unit 104 selects an unselected adjacent pixel i and repeats steps S1006 to S1010. On the other hand, if no adjacent pixel i for which the calculation is to be performed remains (NO in step S1010), the processing proceeds to step S1011.

In step S1011, as in step S207 in FIG. 2, the image processing unit 104 determines whether the number of smoothing target pixels has reached the number of pixels to be smoothed that is set in step S1005. As a result of the determination, if the number of smoothing target pixels has reached the number of pixels to be smoothed that is set in step S1005 (YES in step S1011), the processing proceeds to step S1013. Then, the image processing unit 104 performs smoothing processing on the pixel-of-interest 1101 using the pixel value of the pixel-of-interest 1101 and the pixel values of the smoothing target pixels to each of which the flag is set in step S1008.

On the other hand, as a result of the determination in step S1011, if the number of smoothing target pixels has not reached the number of pixels to be smoothed that is set in step S1005 (NO in step S1011), the processing proceeds to step S1012. In step S1012, the image processing unit 104 expands the reference region.

Figure 13:
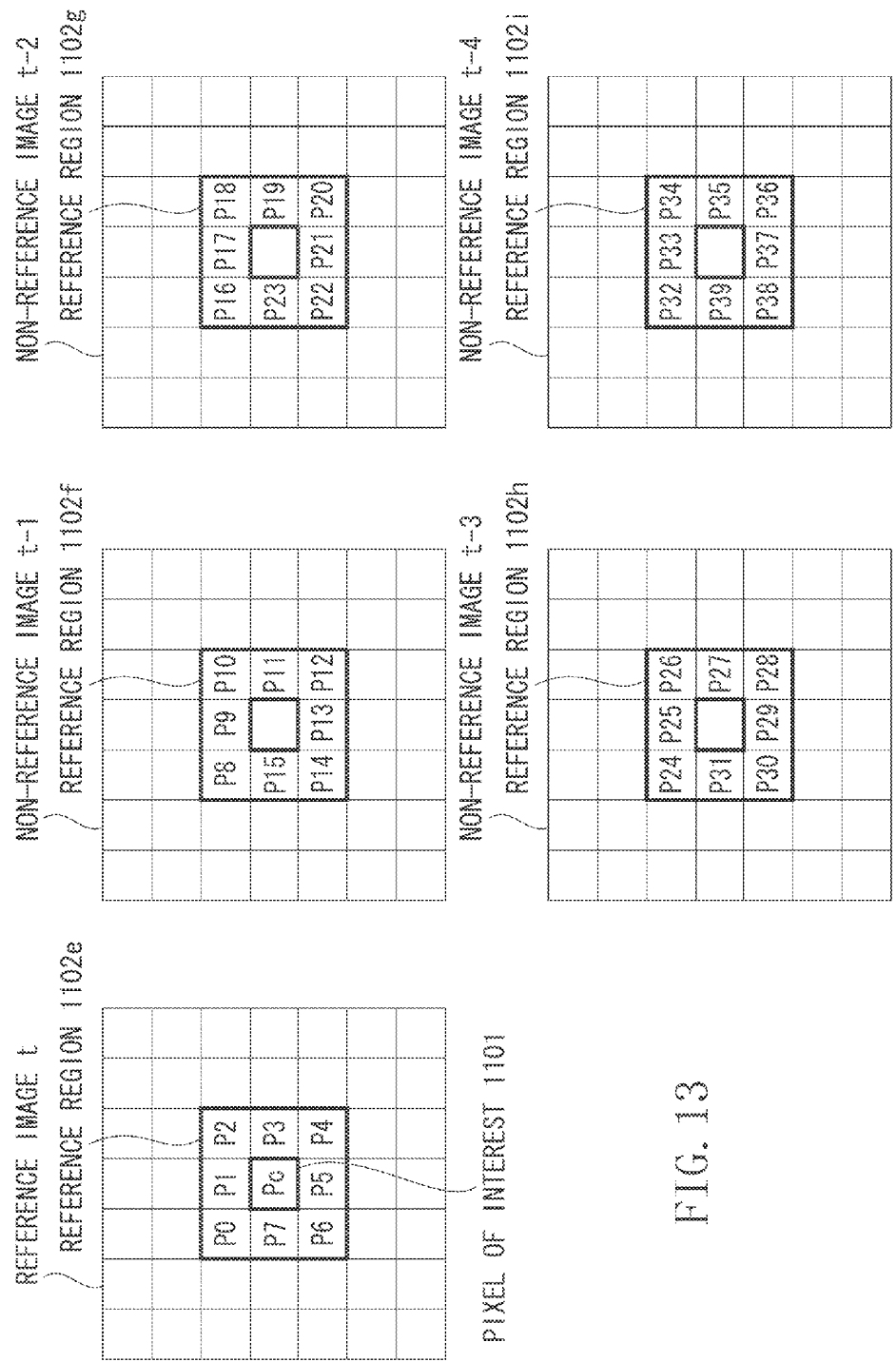
FIG. 13 illustrates reference regions in second processing on a pixel of interest.

FIG. 13 illustrates an example of reference regions 1102a to 1102d in the second processing on the pixel-of-interest 1101.

In FIG. 13, the image processing unit 104 expands the reference regions of the reference image and the non-reference images to set new reference regions 1102e to 1102i. The reference region 1102e of the reference image is a region of 3×3 pixels at a distance Z of 1 from the pixel-of-interest 1101, excluding the pixel at the center. On the other hand, each of the reference regions 1102f to 1102i in the non-reference images is a region of 3×3 pixels at a distance Z of 1 from a pixel of the non-reference image that corresponds to the pixel-of-interest 1101, excluding the pixel at the center. More specifically, in the example illustrated in FIG. 13, the adjacent pixels i included in the reference regions are 40 pixels in total with a pixel value of P0 to P39.

Each time the image processing unit 104 performs step S1012, the distance Z is increased by 1 to expand the reference region. The expansion of the reference region is performed until the number of smoothing target pixels reaches the number of pixels to be smoothed that is set in step S1005 (i.e., steps S1006 to S1012 are repeated).

In step S1011, in a case where the number of smoothing target pixels exceeds the number of pixels to be smoothed, the adjacent pixels i to be smoothed can be selected, for example, as follows.

First, from pixels in the reference region set to the reference image among the latest reference regions set in step S1012, pixels with a smaller absolute difference value DIFF than the threshold value are selected as adjacent pixels i to be smoothed. When the pixels in the reference region set to the reference image are selected as described above, if the number of smoothing target pixels exceeds the number of pixels to be smoothed that is set in step S1005, the following processing is performed. Specifically, from the pixels in the reference region set to the reference image, pixels with a smaller absolute difference value DIFF than the threshold value are selected in increasing order of the absolute difference value DIFF, until the number of selected pixels reaches the number of pixels to be smoothed that is set in step S1005.

In a case where all the pixels with a smaller absolute difference value DIFF than the threshold value are selected from the pixels in the reference region set to the reference image but the number of smoothing target pixels does not reach the number of pixels to be smoothed that is set in step S1005, the following processing is performed. Specifically, from the latest reference regions set in step S1012, the reference region set in step S1012 to the non-reference image captured at the time t-1, which is the closet time to that of the reference image, is extracted. Then, from pixels in the extracted reference region, pixels with a smaller absolute difference value DIFF than the threshold value are selected as the adjacent pixels i on which the smoothing processing is to be performed. When the pixels in the reference region set to the non-reference image captured at the time t-1 as described above, if the number of smoothing target pixels exceeds the number of pixels to be smoothed that is set in step S1005 at the time, the following processing is performed. Specifically, from the pixels in the reference region set to the non-reference image captured at the time t-1, pixels with a smaller absolute difference value DIFF than the threshold value are selected in increasing order of the absolute difference value DIFF, until the number of selected pixels reaches the number of pixels to be smoothed that is set in step S1005.

In a case where all the pixels with a smaller absolute difference value DIFF than the threshold value are selected from the pixels in the reference region set to the non-reference image captured at the time t-1 but the number of smoothing target pixels does not reach the number of pixels to be smoothed that is set in step S1005, the following processing is performed. Specifically, among the latest reference regions set in step S1012, the reference region set in step S1012 from the non-reference image captured at the time t-2, which is the second closest time to that of the reference image, is extracted. Then, the adjacent pixels i on which the smoothing processing is to be performed are selected as in the case of the non-reference image captured at the time t-1. Similarly, a reference region is extracted from the latest reference regions in the non-reference images captured at the times t-3 and t-4 in increasing order of time from the reference image, and adjacent pixels i on which the smoothing processing is to be performed are selected from the extracted reference region, until the number of smoothing target pixels exceeds the number of pixels to be smoothed.

The order of selecting the adjacent pixels i on which the smoothing processing is to be performed is not limited to the above-described order. For example, pixels in the reference region in the reference image may be preferentially selected as adjacent pixels i on which the smoothing processing is to be performed over pixels in the non-reference images that are at corresponding relative positions with respect to the pixel-of-interest 1101 of the reference image. In this case, the non-reference images are referred to if all the pixels with a smaller absolute difference value DIFF than the threshold value are selected from the pixels in the reference region set to the reference image but the number of smoothing target pixels does not reach the number of pixels to be smoothed that is set in step S1005.

In this case, pixels at corresponding relative positions with respect to the pixel-of-interest 1101 of the reference image are selected from the non-reference images in increasing order of time from that of the reference image. Thereafter, the reference regions set to the non-reference images are selected from the non-reference images in increasing order of time from that of the reference image.

Specifically, in the examples illustrated in FIGS. 12 and 13, pixels in the reference region 1102e, pixels in the reference region 1102a, pixels in the reference region 1102f, pixels in the reference region 1102b, and pixels in the reference region 1102g are selected in this order. Thereafter, pixels in the reference region 1102c, pixels in the reference region 1102h, pixels in the reference region 1102d, and pixels in the reference region 1102i are selected.

Further, the reference regions set in step S1011 do not have to be extracted from the non-reference images captured at the times t-1, t-2, t-3, and t-4 in increasing order of time from the reference image.

The above-described processing is performed on each pixel of the input image so that noise is reduced from the entire input image to obtain a noise-reduced output image.

As described above, in the present exemplary embodiment, images captured at different times are further included as reference regions. In this way, the reference region is expanded in the temporal direction to detect smoothing target pixels from a wider range of pixels so that deterioration in image quality can be further prevented.

In the present exemplary embodiment, the case where reference regions in images (reference image and non-reference images) captured at different times are expanded as in the first exemplary embodiment is described as an example. The processing according to the present exemplary embodiment is also applicable to the case where an upper limit value of the size of a reference region is set as in the second exemplary embodiment as well as the case where a large reference region is set in advance as in the third exemplary embodiment. In the case of applying the second exemplary embodiment, step S709 may be added between steps S1011 and S1012 in FIG. 10. In the case of applying the third exemplary embodiment, adjacent pixels i on which the smoothing processing is to be performed are selected without expanding the reference region. In the case where the present exemplary embodiment is applied to the third exemplary embodiment as described above, for example, adjacent pixels i can be selected from the reference image and then from the non-reference images captured at the times t-1, t-2, t-3, and t-4 in increasing order of time from the reference image.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-009736, filed Jan. 22, 2014, which is hereby incorporated by reference herein in its entirety.

What is claimed is:

1. An image processing apparatus comprising:
a processor coupled to a memory;
a selection unit configured to select at least a pixel that is different from a pixel of interest in an image based on a similarity between a pixel value of the pixel different from the pixel of interest and a pixel value of the pixel of interest;
a pixel number setting unit configured to set a number of pixels to be selected by the selection unit;
a determination unit configured to determine, from a pixel selected by the selection unit and based on whether a number of pixels selected by the selection unit has reached the number of pixels set by the pixel number setting unit, at least a pixel to be used in predetermined processing that uses at least a pixel value of a pixel different from the pixel of interest; and
a processing unit configured to perform the predetermined processing on the pixel of interest,
wherein the processing unit performs the predetermined processing on the pixel of interest using a pixel value of the pixel determined by the determination unit, and wherein at least one of the selection unit, the pixel number setting unit, the determination unit, and the processing unit are implemented by the processor.

2. The image processing apparatus according to claim 1, wherein the determination unit determines, as the pixels to be used in the predetermined processing, pixels of a same number as the number of pixels set by the pixel number setting unit.

3. The image processing apparatus according to claim 1, further comprising a reference region setting unit implemented by the processor and configured to set a reference region including the pixel of interest, wherein the selection unit selects at least a pixel in the reference region set by the reference region setting unit.

4. The image processing apparatus according to claim 3, wherein, in a case where the number of pixels selected by the selection unit has not reached the number of pixels set by the pixel number setting unit, the reference region setting unit expands the reference region.

5. The image processing apparatus according to claim 4, further comprising a maximum reference region setting unit implemented by the processor and configured to set an upper limit value of a size of the reference region,
wherein in case where the reference region setting unit expands the reference region to the upper limit value but the same number of pixels as the number of pixels set by the pixel number setting unit are not obtained as the pixels to be used in the predetermined processing, the determination unit determines, as the pixels to be used in the predetermined processing, pixels selected by the selection unit from the reference region expanded to the upper limit value.

6. The image processing apparatus according to claim 5, wherein the maximum reference region setting unit selects at least a pixel,
wherein the at least a pixel is different from a pixel of interest based on a similarity between a pixel value of the pixel different from the pixel of interest and a pixel value of the pixel of interest, and
wherein the pixel of interest is a pixel having a pixel value in the image that the number of pixels having the same pixel value as the pixel value of the pixel of interest is smaller than a threshold value,
wherein, for each pixel of interest, the maximum reference region setting unit expands a region including the pixel of interest to increase a distance from the pixel of interest, until the number of selected pixels reaches the number set by the pixel number setting unit, and
wherein the maximum reference region setting unit sets a largest region of the expanded regions as an upper limit value of the size of the reference region.

7. The image processing apparatus according to claim 4, wherein, in a case where the reference region is expanded to the same area as a region of the image but the same number of pixels as the number of pixels set by the pixel number setting unit are not obtained as the pixels to be used in the predetermined processing, the determination unit determines, as the pixels to be used in the predetermined processing, pixels selected by the selection unit in the reference region expanded to the same area as the region of the image.

8. The image processing apparatus according to claim 4, further comprising an alignment unit implemented by the processor and configured to align a plurality of images including a reference image including the pixel of interest and at least one non-reference image that is a chronologically successive image following the reference image,
wherein, in a case where the number of pixels selected by the selection unit has not reached the number of pixels set by the pixel number setting unit, the reference region setting unit further sets, as the reference region, a region that is defined by pixels in the non-reference image among the plurality of aligned images and corresponds to the reference region in the reference image.

9. The image processing apparatus according to claim 8, wherein, in a case where pixels are at the same distance from the pixel of interest or a pixel of the non-reference image corresponds to the pixel of interest, the determination unit determines a pixel to be used in the predetermined processing from a pixel in the reference image and a pixel in the non-reference image chronologically close to the reference image in this order.

10. The image processing apparatus according to claim 1, wherein, in a case where the number of pixels selected by the selection unit exceeds the number of pixels set by the pixel number setting unit, the determination unit determines a pixel to be used in the predetermined processing from the pixel selected by the selection unit based on a distance of the pixel selected by the selection unit from the pixel of interest and a similarity between a pixel value of the pixel selected by the selection unit and the pixel value of the pixel of interest.

11. The image processing apparatus according to claim 10,
wherein the determination unit determines a pixel to be used in the predetermined processing from the pixel selected by the selection unit in increasing order of distance from the pixel of interest and,
wherein, in a case where pixels are at the same distance from the pixel of interest, the determination unit determines a pixel to be used in the predetermined processing in decreasing order of similarity to the pixel value of the pixel of interest.

12. The image processing apparatus according to claim 1, further comprising:
an alignment unit implemented by the processor and configured to align a plurality of images including a reference image including the pixel of interest and at least one non-reference image following the reference image; and
a moving object determination unit implemented by the processor and configured to determine whether the non-reference image includes a moving object based on a result of the alignment, wherein the determination unit excludes, from the pixel to be used in the predetermined processing, a pixel corresponding to the moving object.

13. The image processing apparatus according to claim 1, wherein the selection unit selects, from pixels different from the pixel of interest, a pixel having a smaller absolute value of a difference between a pixel value of the pixel and the pixel value of the pixel of interest than a threshold value.

14. The image processing apparatus according to claim 13, wherein the threshold value is changed according to at least one of sensitivity at a time of capturing an image, temperature of an image sensor configured to capture the image, and brightness of the image.

15. The image processing apparatus according to claim 1, wherein the processing unit performs processing to obtain as the pixel value of the pixel of interest, a mean value of the pixel value of the pixel of interest, and a pixel value of the pixel determined by the determination unit.

16. The image processing apparatus according to claim 1, wherein the processing unit performs the predetermined processing on a plurality of pixel of interest from an image, and wherein the number of pixels to be selected by the selection unit is the same for each pixel of interest from the plurality of pixel of interest (compare background).

17. The image processing apparatus according to claim 1, wherein the predetermined processing is one of a smooth processing and a noise reduction processing.

18. An image processing method for an image processing apparatus, the image processing method comprising:

selecting at least a pixel that is different from a pixel of interest in an image based on a similarity between a pixel value of the pixel different from the pixel of interest and a pixel value of the pixel of interest;

setting a number of pixels to be selected by the selecting;

determining, using a processor coupled to a memory and from a selected pixel and based on whether a number of selected pixels has reached the set number of pixels, at least a pixel to be used in predetermined processing that uses at least a pixel different from the pixel of interest; and performing the predetermined processing on the pixel of interest, wherein performing includes performing the predetermined processing on the pixel of interest using a pixel value of the determined pixel.

19. A non-transitory computer-readable storage medium storing a program to cause an image processing apparatus to perform a method, the method comprising:

selecting at least a pixel that is different from a pixel of interest in an image based on a similarity between a pixel value of the pixel different from the pixel of interest and a pixel value of the pixel of interest;

setting a number of pixels to be selected by the selecting;

determining, using a processor coupled to a memory and from a selected pixel and based on whether a number of selected pixels has reached the set number of pixels, at least a pixel to be used in predetermined processing that uses at least a pixel value of a pixel different from the pixel of interest; and performing the predetermined processing on the pixel of interest, wherein performing includes performing the predetermined processing on the pixel of interest using a pixel value of the determined pixel.

* * * * *